No. 872,359. PATENTED DEC. 3, 1907.
F. N. LOWRY.
AUTOMATIC MEASURING TANK.
APPLICATION FILED APR. 7, 1905.
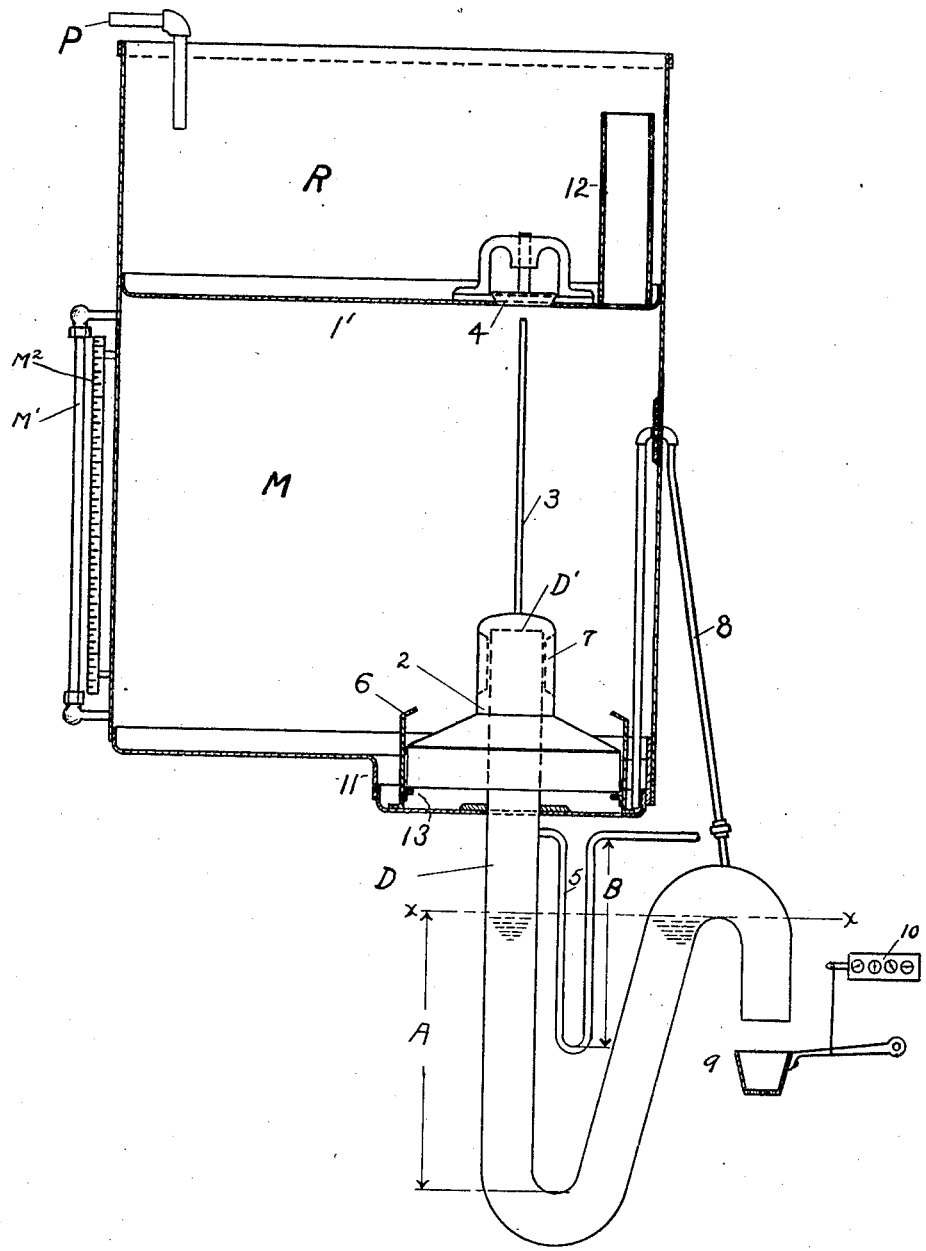
WITNESSES:
J. R. Mansfield.
C. R. Wallis.
INVENTOR
Frederick N. Lowry.
BY
Geo. B. Willcox.
ATTORNEY

UNITED STATES PATENT OFFICE.

FREDERICK N. LOWRY, OF MIDLAND, MICHIGAN.

AUTOMATIC MEASURING-TANK.

No. 872,359.  Specification of Letters Patent.  Patented Dec. 3, 1907.

Application filed April 7, 1905. Serial No. 254,391.

*To all whom it may concern:*

Be it known that I, FREDERICK N. LOWRY, a citizen of the United States, residing at Midland, in the county of Midland and State of Michigan, have invented certain new and useful Improvements in Automatic Measuring-Tanks; and I do hereby declare the following to be a full, clear, and exact description of the invention, such as will enable others skilled in the art to which it appertains to make and use the same.

This invention relates to liquid measuring apparatus, one object being to provide means for automatically measuring the amount, volume or weight of continuously flowing liquid discharged from a pipe.

Another object is the provision of means for so measuring the volume or weight of liquid from a continuously flowing pipe without interfering with the flow of liquid.

To accomplish these objects I provide a means for receiving and storing the liquid and a receptacle in communication therewith for receiving a predetermined or unit charge of liquid therefrom and delivering it automatically, the delivery of each charge being noted.

A further object of my invention is to provide means for accomplishing the discharge of the measured unit in the receptacle quickly and without the use of valves, also to provide means for preventing the admission of liquid to the receptacle during the time of discharge of the measured unit, thereby insuring the accurate measurement of all liquid passing through the apparatus.

To these ends I have illustrated and described one embodiment of my invention in the following specification and accompanying drawings, the invention consisting in the features therein disclosed together with the equivalents thereof, the drawing illustrating a diagrammatic vertical sectional view through an apparatus embodying one form which my invention is capable of assuming.

The drawing shows a tank or receptacle which may be of an even diameter throughout, the tank being subdivided transversely of its length by a partition (1) whereby are formed the upper receiving compartment or reservoir (R) and the lower measuring compartment (M), which as shown, may be provided with a well (11). A supply pipe (P) leads from any suitable source of liquid to be measured and discharged into the reservoir (R), the liquid flowing into the reservoir through the pipe continuously or intermittently, the liquid being supplied to the measuring compartment from the reservoir, as hereinafter set forth.

Projecting into the well through a suitably packed aperture and extending upward a suitable distance above the bottom of the well and preferably above the bottom of the measuring compartment, is a delivery or discharge pipe (D) which may be of substantially U- or siphon-shape, as shown, though I do not confine myself to the exact form of discharge pipe disclosed in the drawings, as other forms of delivery pipe embodying the liquid sealing feature may be utilized. The discharge pipe should contain liquid for sealing purposes and hence I shall call it a valveless liquid containing discharge pipe, no valves being employed in its construction. The outer end of the discharge pipe is bent over as shown for convenience in delivering the liquid, which delivery causes the actuation of a suitable counting or other measuring device. As showing one form of counting device, a perforated receptacle (9) may be located in position to receive the discharged liquid, said receptacle being pivotally supported and connected to a suitable counter (10) which is operated by the downward movement of the receptacle caused by the weight of liquid received from the delivery pipe at each discharge.

Located preferably in the well and about the upper projecting end of the liquid containing discharge pipe are a plurality of upright guides (6), (6) between which guides is located the bell or float (2) which incloses and fits over the upper end (D') of the discharge pipe. This bell may be formed with a restricted upper portion provided with internal ribs or wings (7) (7), adapted to slidingly engage with the discharge pipe to aid the guides (6) (6), which engage the outer larger periphery at the lower end of the bell. These guides (6) (6) are bent over at their upper ends to limit the upward movement of the bell and are provided near their lower ends with projecting lugs designed to form a seat for the float to limit its downward movement whereby a space is preserved between the bottom of the well and the lower edge of the float for the purpose of permitting the water to rise in the bell during the filling of the measuring compartment and further permits the siphoning action of the water as it is discharged from the compartment after the bell has fallen to its lowest position.

Carried by and projecting upwardly from the float is a rod (3), the upper end of which when the float is in its lowered position, lies beneath and in alinement with a valve (4) located in the partition (1) dividing the reservoir from the measuring compartment, the valve permitting communication between the reservoir and the measuring compartment and the partition (1) is also provided with a stand pipe (12) of suitable height so that the water in the reservoir, after attaining the necessary depth may pour into the upper open end of the stand pipe and enter the measuring compartment. This compartment may also be provided with a gage glass (M') and a scale (M²), a siphon (8) being employed to drain the well (11) as hereinafter described, one leg of the siphon extending nearly to the bottom of the well while the remaining leg communicates with the bent over discharge end of the pipe (D).

Located, it may be as shown for convenience, outside the tank is the tripping siphon (5), the same comprising a preferably U-shaped pipe, one end of which may be connected to that leg of the valveless liquid containing discharge pipe (D), which communicates with the measuring compartment, said tripping siphon being connected at a point above the level x—x of the water contained in the pipe, (D), the tripping siphon also containing water and though I have shown the same in this embodiment of my invention as located outside the tank, it will be readily seen that its function will be preserved so long as one end of the pipe (5) is arranged to communicate with the air space formed by the interior area of the bell and the upper end of the pipe (D) received in the bell, or with the interior of the bell or float above the water level therein.

Having thus fully described the various elements of construction comprising the present embodiment of my invention, I will set forth its operation. We must first assume that the discharge pipe (D) is filled with liquid to the level indicated by the line x—x and that the tripping siphon (5) is likewise filled with liquid. Water or other suitable liquid is supplied to the reservoir (R) in a continuous or intermittent stream through pipe (P), collecting in the reservoir until it overflows the top of the stand pipe (12), the valve (4) remaining normally in closed position. Overflowing the top of the stand pipe, the liquid falls into the measuring compartment, first filling the well (11) and sealing the lower open end of the float (2) which rests upon the lugs (13), of the guides and as the height of water increases in the measuring compartment (M), the air in the upper portion of the float and in the upper end of the liquid containing pipe (D) will be gradually compressed thereby causing the liquid in the left hand branches of pipes (D) and (5) to descend, the excess liquid flowing out of the right hand branches. In other words, the columns of liquid in the left hand branches of pipes (D) and (5) are depressed by the gradually increasing weight of liquid in the measuring compartment acting upon the columns through the intermediate air which separates the liquid in the compartment from that in the pipes (D) and (5). Prior to exerting any particular pressure upon the water columns, however, the air contained in the float will operate to force the latter upwardly between the guides until the ascension of the float is stopped by the bent over upper ends of the guides. The upward movement operates to cause the rod (3) to force open the valve (4) and retain the same in open position whereby to quickly empty the reservoir (R) and cause the measuring compartment to quickly fill with liquid. A further object thus accomplished by emptying the resevoir (R) is to provide a receptacle for receiving liquid from pipe (P), while the measuring compartment is being emptied. The sizes of the valve (4) and the stand pipe (12) are proportioned in accordance with the size of the supply pipe (P), and the capacity of the reservoir and the height of the stand pipe must be such that the water in the reservoir (R) will not overflow into pipe (12) until the measuring compartment has been completely emptied.

As the measuring compartment fills with liquid the air in the float and in the upper end of the pipe (D) and in the left hand branch of pipe (5) is placed under a continually increasing pressure caused by the increasing head of liquid in compartment (M), which pressure of air, since it can force the float no higher, is exerted against the columns of liquid in the pipes (D) and (5), gradually forcing the water or other liquid out of the free open ends of the pipes and causing the level of the inner columns of liquid to sink until the lowest point in the pipe (5) is reached when the pressure of the air overcomes the head of the liquid in the pipe (5) causing the liquid in said pipe (5) to be blown out, thereby breaking the liquid seal and permitting the air compressed in the float and pipes (D) and (5) to exhaust through tripping pipe (5), whereupon the float which has been held at its upward limit of movement is suddenly relieved of its air and sustaining pressure and immediately sinks and rests upon the ears or lugs (13) (13) and the liquid in the measuring compartment swiftly rises the remaining distance in the float, the liquid having mounted higher and higher in the float as the compression of air increased and as the liquid in pipes (D) and (5) is expelled, and flows into the discharge pipe (D) setting up a siphoning action until the level of the liquid in the measuring compartment reaches the lower edge of the bell when the flow stops and the level of the liquid in the bell is left slightly higher than the level of liquid outside the bell, and the compartment is ready to receive the next charge, the pipes (D) and (5) being sealed with liquid as at the outset. Of course, as the float drops at the commencement of the siphoning action, the valve (4) is closed to prevent the entrance of liquid to the compartment (M) and said liquid pouring from pipe (P) collects in the reservoir until the compartment is full, when it will again commence to flow into the measuring compartment through the stand pipe and the action will be repeated.

As the measuring compartment is emptied of its liquid, air may be admitted thereto through the stand pipe (12) or in any other suitable manner to prevent the formation of a vacuum in the compartment and also to permit the replenishment of the float and pipes with air at the moment the siphoning action ceases, the float being supported above the bottom of the well for this purpose. Of course, though the main discharge of liquid is through pipe (D) a certain amount of liquid would flow through pipe (5) and in this connection it may be noted that the siphon (5) is of less length and of smaller diameter than discharge pipe (D) so that the breaking of the seal in siphon (5) may take place prior to the breaking of the seal in pipe (D), it being at least desirable though perhaps unnecessary that the air be released through the tripping siphon. For the maximum charge of which the compartment is capable, the bell should be proportioned in capacity to the pipes (D) and (5), so that the volume of compressed air at the moment when the siphoning action commences is sufficient to maintain the level of liquid within the bell at a point below the upper end of discharge pipe (D). The effective head of liquid in the tripping pipe (5) and in pipe (D) counterbalances the head of liquid in the measuring compartment.

It is obvious that the measuring compartment might be so arranged that the discharge therefrom will take place as soon as the reservoir (R) has been emptied of the liquid collected therein or the discharge may not occur until more liquid from pipe (P) has flowed into the compartment (M) through valve (4) to increase the amount of liquid in the charge received by the measuring compartment (M). It is evident that at some predetermined height in the measuring compartment dependent upon the weight of the particular liquid being measured, the hydrostatic equilibrium between the liquid in the pipes (D) and (5) and that in the measuring compartment is destroyed, the amount of liquid then in the compartment constituting the unit charge measured by the apparatus or by allowing the liquid level to rise above partition (1) before the hydrostatic equilibrium is destroyed, it is evident that the unit charge will consist of all the liquid below the partition (1), and will be of a constant volume unaffected by the varying rate of supply of the liquid to the apparatus.

If it is desired to measure all the liquid in the compartment, the siphon (8) may be provided. When the liquid is rushing out of the discharge (D) during the siphoning action, the air in the siphon is drawn with it whereby an auxiliary siphoning action is set up through siphon (8), such action continuing until the level of the liquid in the well is reduced to the level of the lower end of siphon (8), resulting in almost completely emptying the measuring compartment, and by the use of this siphon the replenishing of the float and pipes (D) and (5) with air is greatly facilitated, owing to the fact that the lower end of the inner leg of the siphon (8) extends to a point some distance below the lowest limit of movement of the float, though such replenishing will take place if the siphon (8) is not employed.

From the foregoing, it will be observed that I have provided a discharge pipe (D) which always contains liquid and serves at all times to seal the pipe against the escape of air therethrough. That portion of the discharge pipe (D) above the level $x$—$x$ of liquid therein and the interior volume of the float (2) constitute an air chamber tapped by the tripping pipe (5). As the pressure of the air increases, due to the increased head of liquid in compartment (M), the level of liquid in the left hand branches of the pipes (D) and (5) is reduced, the excess liquid running out of the open ends of the right hand branches of said pipes, until the level of the liquid in the left hand branch of pipe (5) has been depressed the distance (B), pipe (5) being of less length than pipe (D). Any further increment of head in compartment (M) cannot be balanced by the effective head of liquid in the right hand branch of pipe (5), since the latter has reached its maximum, because no further depression of liquid in the left hand branch can take place. Therefore the hydrostatic equilibrium is destroyed, the air being released through the pipe (5) carrying before it the liquid contained in the right hand branch of pipe (5). Of course, as the pressure of air in the left hand branch of pipe (5) increases, it depresses the level of the column of liquid therein and causes an increased effective head in the right hand branch of the pipe (5) which effective head increases until it is equal to (B). The atmospheric pressure is of course, equal on the liquid in the compartment (M) and on the columns of liquid in the pipes (D) and (5).

Another feature of importance is the fact that the measuring compartment contains no outlet valves to get out of order and cause leakage or other trouble, the only valve used in the entire apparatus being the inlet valve from the reservoir to the measuring compartment.

Although I have referred to the different parts of the apparatus only as shown by the drawing, it is evident that changes and alterations may be made in the size, shape, style and relative positions, as well as in the forms and arrangements of the different parts described which may vary to any extent consistent with the proper working of the measuring mechanism without departing from the spirit and scope of my invention and hence I do not wish to limit myself to the exact constructions herein set forth.

What I claim as my invention and desire to secure by Letters Patent is as follows,—

1. A liquid measuring device comprising a receiving compartment and a measuring compartment communicating therewith; together with a U-shaped discharge pipe having one end projecting into said measuring compartment; a U-shaped pressure-regulating pipe communicating with said upwardly-projecting end of said discharge pipe at a point above the normal liquid level in said discharge pipe; together with an inverted cup float inclosing the upper end of said discharge pipe, substantially as described.

2. A liquid measuring device comprising a measuring compartment for receiving liquid, an inverted bell, the upper end of which is closed, the lower end being open, a liquid sealed discharge pipe communicating with the bell, and coöperating therewith to form an air space wherein the air is compressed by the weight of the liquid admitted to the measuring compartment, and a liquid holding pipe connecting the air space with a point under less pressure outside the air space.

3. In a liquid measuring device, a bell containing a compartment, a valveless liquid sealed discharge pipe communicating with said compartment in the bell and forming therewith an air space, and a tripping means connecting the air space with a point under less pressure outside of said bell.

4. In a liquid measuring device, a bell containing a chamber, a liquid-sealed discharge pipe communicating with the chamber in the bell and coöperating therewith to form an air space for alternately containing compressed air and the liquid being measured; and a tripping member connecting the air space with a point under less pressure outside of said bell.

5. A liquid measuring device comprising a chamber, a valveless liquid-sealed pipe communicating therewith, and adapted to alternately contain air or vapor and the liquid being measured, and a liquid-sealed tripping member in direct communication with the discharge pipe and connecting the air space of said chamber and pipe with a point under less pressure.

6. A liquid measuring device comprising a suitable compartment having a well formed therein, a float received in the well, means for limiting the movement of the float in each direction, a liquid-sealed discharge pipe, one end of which projects into the compartment over which end the float is received, the pipe extending into the float, and an automatic tripping connection in communication with the air space formed by the float and the upper end of the discharge pipe.

7. A liquid measuring device comprising a suitable compartment, a liquid-sealed discharge pipe extending into the compartment, a bell fitting over that portion of the discharge pipe within the compartment and forming therewith an air chamber, and a tripping means in direct communication with the air chamber.

8. A liquid measuring device comprising a compartment, a well formed therein, a discharge pipe communicating with the compartment, a bell inclosing that end of the discharge pipe within the compartment, and forming therewith an air chamber, a tripping means directly communicating with the air chamber and means for draining the well.

9. A liquid measuring device comprising a receptacle, a discharging liquid-sealed pipe in communication therewith, means comprising an air chamber for permitting a compression of air on one column of liquid in the liquid-sealed pipe and means connected with the air chamber for automatically releasing the air pressure at a predetermined point.

10. A liquid measuring device comprising a receptacle and a means of supply therefor, a discharging liquid-containing siphon communicating with the receptacle, means comprising an air chamber for permitting a compression of air on the column of liquid in that branch of the discharge siphon which communicates with the receptacle; a tripping liquid-sealed siphon of less height than the discharge siphon, one leg of the tripping siphon connected directly with the air chamber for releasing the air at a predetermined point when the liquid in the receptacle has attained a predetermined head.

11. A liquid measuring device comprising a receptacle and means of supply therefor, a discharge liquid-sealed pipe extending into the receptacle, means for causing a constantly increasing pressure in the liquid sealed pipe and means for automatically effecting a sudden release of the air pressure when a predetermined weight of liquid is received in the receptacle to cause the discharge of the contents of the receptacle.

12. A liquid measuring device comprising a receptacle having a well formed therein, a liquid-holding pipe communicating therewith to discharge the contents of the receptacle when a predetermined weight of liquid has been received in the receptacle, and means extending into the well and connected with the liquid-holding pipe to empty the well.

13. A liquid measuring device comprising a receptacle having a well formed therein, a liquid supply therefor, a liquid-sealed pipe communicating therewith to periodically discharge the contents of the receptacle, an air-entraining means coöperating with the liquid-sealed pipe to constitute an air chamber, and means extending into the well and connected with the liquid-sealed discharge pipe, to empty the well to a point below the air-entraining means.

14. A liquid measuring device comprising a receptacle, a discharge pipe passing into the receptacle, a movable bell inclosing that end of the discharge pipe within the receptacle and being limited in its movement to leave a space between the edge of the bell and the bottom of the receptacle, means for causing the evacuation of the contents of the receptacle to a point approximately level with the lower edge of the bell when in its lowest position, and means for withdrawing the remainder of the liquid from the receptacle.

15. A liquid measuring device comprising a receptacle, a liquid-sealed discharge pipe extending thereinto, a bell in the receptacle fitting over the opening in the discharge pipe and coöperating therewith to form an air chamber, shouldered guides located exteriorly of and surrounding the bell to limit its movement in one direction and means for releasing the air confined within the air chamber when a predetermined weight of liquid has been received in the receptacle.

16. A liquid measuring device comprising a receptacle, a discharge pipe extending thereinto, an air-confining means inclosing the opening in the pipe, means for releasing the air from the confining means and means for supporting and limiting the movement of the confining means subsequent to the release of the air therein.

17. A liquid measuring device comprising a receptacle, a supply therefor, a discharge liquid-holding pipe extending thereinto, an air-containing means in the receptacle located around the end of the pipe for permitting the increasing volume of liquid in the receptacle to compress the air confined in the containing means, and in the pipe above the level of the liquid therein, and a tripping liquid-holding pipe communicating with the entrained air to release the latter at a predetermined point.

18. A liquid measuring device comprising a receptacle, a supply therefor, a discharge pipe leading therefrom, means for periodically effecting an evacuation of the contents of the receptacle through the discharge pipe, and conducting means connected with the discharge pipe and extending into the receptacle, said means caused to operate by the passage of liquid through the discharge pipe to aid in discharging the contents of the receptacle.

19. A liquid measuring device comprising a receptacle, a liquid-holding discharge means extending thereinto, a single compartment member adapted to inclose the opening in the discharge means within the receptacle, and coöperating therewith to form an air chamber, and means located exteriorly of the receptacle for releasing the air within the air chamber.

20. A liquid measuring device comprising a measuring compartment, a liquid-holding discharge means, one end of which extends into the compartment, air-containing means coöperating with that end of the discharge pipe within the compartment for permitting a compression of air within the discharge means above the level of the liquid therein and means for automatically releasing the compressed air.

21. A liquid measuring device comprising a tank having isolated receiving and measuring compartments, means for supplying liquid to the receiving compartment, a plurality of means in the receiving compartment for permitting the liquid to discharge into the measuring compartment, a liquid-holding discharge means, one end of which extends into the measuring compartment, an air-containing means in the compartment inclosing the end of the discharge means, and coöperating therewith to form an air chamber, and a tripping means in communication with the air-containing means.

22. A measuring apparatus comprising a supply, a compartment intermittently receiving a charge from the supply, a liquid-sealed discharge pipe, one end of which projects into the compartment, means in the compartment combined with the end of the discharge pipe for entraining a supply of air or vapor between the liquid in the compartment and the liquid in the discharge pipe, and a liquid-sealed member for releasing the air when the liquid in the compartment attains a predetermined height.

23. A liquid measuring apparatus comprising a compartment, a supply therefor, a main discharge connected with the compartment, means for effecting the discharge of the contents of the compartment when the contents has attained a predetermined height, and a siphoning means connected with and caused to operate by the discharge of the contents of the compartment for draining the compartment.

24. A measuring apparatus comprising a receiving compartment, a measuring compartment, a liquid-sealed discharge pipe projecting into the measuring compartment, a bell in the compartment inclosing the end of the discharge pipe whereby an air space is formed in the end of the pipe and in the bell and a pressure-controlled, automatically-released vent for the air entrained in the bell and pipe.

25. A measuring apparatus comprising a reservoir, a measuring compartment, a liquid-sealed, valveless, discharge pipe projecting into the measuring compartment, a bell in the compartment inclosing the end of the discharge pipe whereby an air space is formed in the end of the pipe and in the bell and a pressure-controlled, automatically-released vent for the air or vapor entrained in the bell and pipe.

26. A measuring apparatus comprising a reservoir, a measuring compartment, a valve for affording communication between the reservoir and compartment, a liquid-sealed discharge pipe, one end of which projects into the compartment, a bell inclosing the end of the discharge pipe and combining therewith to form an air chamber, the bell capable of a limited movement relative to the pipe, means carried by the bell for opening the valve and a pressure-controlled, automatic vent for releasing the air in the air chamber.

27. A measuring apparatus comprising a reservoir, a measuring compartment, a liquid-sealed discharge pipe, one end of which projects into the compartment, a movable bell in the compartment inclosing the end of the discharge pipe, means for limiting the descent of the bell so as to leave a space between the lower edge of the bell and the bottom of the compartment, the bell and discharge pipe constituting an air chamber and means for automatically permitting the release of the air in the chamber.

28. A measuring apparatus comprising a reservoir, a measuring compartment, a liquid-sealed discharge pipe, one end of which projects into the measuring compartment, a bell in the compartment inclosing the end of the discharge pipe and combining therewith to form an air chamber, means for releasing the air in the air chamber and means for discharging the liquid in the compartment to a point below the level of the lower edge of the bell.

29. A liquid measuring apparatus comprising a compartment, means for suitably supplying the same with liquid, a liquid-sealed discharge pipe, one end of which projects above the bottom of the compartment, a hollow, air-containing means in the compartment inclosing the end of the discharge pipe, and a tripping member connected to the discharge pipe below the bottom of the compartment.

30. A liquid measuring device, comprising a measuring compartment having an inlet opening, a valve mechanism controlling the opening, means for actuating the valve mechanism to admit liquid to the measuring compartment and for accomplishing the discharge of liquid therefrom, said means comprising a liquid-sealed discharge pipe projecting into the measuring compartment and adapted to be automatically supplied with a sealing liquid, a chamber air tight on the top and open on the bottom, the chamber surrounding the upwardly projecting end of said discharge pipe and combining therewith to form an air chamber for entraining air or vapor, a connection between the chamber and the valve mechanism, and an auxiliary liquid-sealed pipe adapted to release the air or vapor entrained between the liquid in the discharge pipe and the liquid in the measuring compartment.

In testimony whereof I affix my signature, in presence of two witnesses.

FREDERICK N. LOWRY.

Witnesses:
 JAMES J. SAVAGE,
 THOMAS E. McCANN.